United States Patent Office 3,519,432
Patented July 7, 1970

3,519,432
POTATO CHIP PRODUCT AND PROCESS
John A. Succo and Rudolph William Youngquist, Colerain Township, Hamilton County, Ohio, assignors to The Procter & Gamble Company, Cincinnati, Ohio, a corporation of Ohio
No Drawing. Filed Dec. 20, 1966, Ser. No. 603,137
Int. Cl. A23l 1/12
U.S. Cl. 99—100                                    4 Claims

ABSTRACT OF THE DISCLOSURE

A formulated potato chip is prepared by admixing comminuted raw potatoes, amylopectin, egg albumen, stearyl monoglyceridyl citrate, shortening, and, optionally, sugar and potato starch to form a homogeneous dough. The dough is formed into thin, substantially elliptical or oval wafers which are frozen to facilitate handling. The wafers are baked to provide a crisp, tasty, edible potato chip which has blistered surfaces resembling those of conventional potato chips prepared by deep fat frying slices of raw potatoes.

BACKGROUND OF THE INVENTION

This invention relates to a potato chip product and to the process for preparing the same. More particularly, it relates to an improved potato chip product and process in which the particle size of raw potatoes is reduced to prepare a dough which is shaped and baked to form a crisp, tasty, edible potato chip product which has a cellular structure and a blistered surface resembling that of conventional potato chips prepared by deep fat frying slices of raw potatoes.

The preparation of doughs from which uniform, homogeneous potato chips can be made has been previously disclosed by Markakis et al. in U.S. Pat. 3,027,258; by Hilton in U.S. Pat. 3,109,739; and by Schaul in U.S. Pat. 2,469,995. In each of the above-mentioned patents a dough is prepared which is then rolled or otherwise flattened to provide a thin sheet. The thin sheet is cut into suitably shaped pieces and the latter are fried or baked until they are crisp.

The finished chips which are prepared by combining the ingredients according to the processes described in the prior art are crisp but lack the blistered surface appearance of conventional potato chips prepared by deep fat frying thin slices of raw potatoes. This blistered appearance is desirable in the chips prepared from a dough because the finished chips more closely resemble conventionally prepared chips and the consuming public is accustomed to chips having a blistered surface. Furthermore, blistered chips are more tender and less cracker-like in texture than unblistered chips and are thus preferred on the basis of their eating quality.

SUMMARY OF THE INVENTION

Briefly stated, the present invention comprises the process of preparing potato chips from a dough based on comminuted raw potatoes and the potato chip product obtained by forming and baking the dough. The dough is formed into thin, flat wafers having a substantially uniform thickness of from about 0.02 inch to about 0.05 inch. The dough is prepared by admixing comminuted raw potatoes, amylopectin, egg albumen, $C_{14}$–$C_{22}$ acyl monoglyceridyl citrate, shortening, and, optionally, sugar and potato starch to form a dough comprising from about 8% to about 20% comminuted raw potatoes, from about 2% to about 30% amylopectin, from about 20% to about 78% water, from about 0.5% to about 3% egg albumen, from about 0% to about 2% sugar, from about 0% to about 10% potato starch, from about 0.25% to about 2% $C_{14}$–$C_{22}$ acyl monoglyceridyl citrate, and from about 5% to about 25% shortening. The formed wafers are frozen to facilitate handling and then are baked at a temperature of from about 325° F. to about 450° F. to form a crisp, tasty potato chip having a blister surface resembling that generally found on conventional potato chips prepared by deep fat frying slices of raw potatoes.

DESCRIPTION OF THE PREFERRED EMBODIMENTS

A potato chip of the character contemplated by the present invention can be prepared from potato varieties which are suitable for the preparation of potato chips and which provide the desired potato chip taste. While the Kennebec variety is preferred, Russet Burbank, Idaho Russet, and Sebago potatoes are among other varieties which can be employed in the present invention to provide potato chips having a good flavor.

The potatoes are peeled and diced to form substantially cubical pieces which can range from about ¼-inch to about ½-inch in size. The cubes are reduced in particle size by pulverization to provide a potato mash which has only a slightly grainy feel. In the course of reducing the particle size of the raw potatoes it is preferable that the starch granules of the potatoes remain substantially intact so that the dough which is subsequently formed does not become excessively sticky. In addition, if too many starch granules are broken, part of the soluble starch thereby released is lost upon subsequent removal of excess water from the resulting slurry.

Reduction of the particle size of the raw potatoes can be accomplished in any apparatus which will cut or shear the potatoes into fine particles without excessive rupture of the starch granules. The particle size is preferably from about 0.015 inch to about 0.03 inch. Crushing of the potatoes should be avoided since this results in the formation of a stringy pulp and adversely affects the texture of the final product. Good results have been obtained by the use of a Waring Blendor to which is added a quantity of water equal to about half the weight of the potatoes to be pulverized. The quantity of water which is added is not critical but its presence has been found to be necessary in order to obtain quick, uniform pulverization of the diced potatoes and to provide a smooth mixture of finely divided potato solids and water. The pulverization step is preferably performed within about 15 to 30 seconds to prevent discoloration of the potatoes. Discoloration can be minimized, however, by adding to the diced potato-water mixture small amounts of sulfite, such as sodium bisulfite.

After the particle size of the raw potatoes has been reduced to form a mixture of finely divided potato solids and water, a portion of the water is separated therefrom to provide a mixture having a water content of from about 50% to about 60% by weight. If the water content of the mixture is greater than about 60% by weight the dough which is subsequently formed is difficult to handle in that it is weak and thin in body; if the water content is less than about 50% by weight of the mixture the resulting potato chip product is undesirably dry and has an eating quality which is more cookie- or cracker-like than chip-like. The separation of the excess water from the mixture can be accomplished by means of, for example, a centrifuge, a screw press, or by filtration through a cloth.

The resulting slurry of potato solids and water is intimately intermixed with shortening, sugar, egg albumen, amylopectin, and, optionally, sugar and potato starch, in quantities and in a manner hereinafter described, to form a homogeneous dough. Preferably, the potato-water slurry comprises from about 20% to about 40% of the dough.

The shortening comprises from about 5% to about 25% of the dough on a weight basis and is preferably a normally plastic triglyceride composition having an iodine value of from about 50 to about 90. A normally plastic triglyceride composition is a fat which is non-pourable at ambient temperatures (about 70° F. to 100° F.), but which contains sufficient normally liquid oil and low melting solids that the composition is converted to a liquid upon heating. The base oil of such a plastic triglyceride composition is a normally triglyceride oil. Uniformly dispersed in the base oil is sufficient high melting, highly hydrogenated triglyceride solids having an iodine value of less than about 12 (commonly referred to as hardstock) to give the composition its plastic consistency. Generally, the highly hydrogenated triglyceride hardstock comprises from about 5% to about 50% by weight of the total composition. Examples of normally plastic fats which are useful in the compositions disclosed herein are described in U.S. Pat. 2,132,394, issued to Coith, Richardson, and Votaw on Oct. 11, 1938, and in U.S. Pat. 2,801,177, issued to Lutton on July 30, 1957.

The shortening can contain the usual minor amounts of emulsifiers and other agents such as, for example, mono- and di-glyceride emulsifiers, lactylated glyceride emulsifiers, sorbitan or polyoxyethylene sorbitan esters of fatty acids, esters of polyhydric alcohols, fatty acid derivatives of polycarboxylic acids, free fatty acids, and many other substances commonly used in shortening to improve the cooking or other properties.

Although the use of the above-described shortenings will provide a crisp potato chip in conjunction with the other ingredients of the dough as hereinafter discussed, even greater crispness can be obtained, if desired, and at a lower dough shortening level by substituting a shortening comprising equal weights of the plastic shortening described above and partially hydrogenated soybean oil having a solids content index (SCI) of about 11 at a temperature of 70° F. and having an iodine value of from about 75 to about 95. When this oil is employed in the composition of the present invention, the total shortening level of the dough can range from about 5% to about 15% by weight.

Sugard can optionally be added to the dough to replace that quantity of soluble sugar which is present in raw potatoes but which is lost as a result of removing the excess water from the slurry of potato solids and water. If incorporated into the dough the sugar is preferably a non-reducing sugar such as sucrose. If a reducing sugar, such as glucose or maltose, is included in the dough, a smaller quantity of such sugar is used than non-reducing sugar since the reducing sugars combine more readily with the amino acids present in potatoes to provide the desired browning effect. Thus, the addition of the same quantity of reducing sugar as non-reducing sugar will result in an increase in the rate and degree of browning which takes place upon baking the final product. Since it is desired that the color of the final product be a light or pale yellow rather than dark brown in color, the sugar content of the dough should range from about 0% to about 2% by weight if a non-reducing sugar is employed and from about 0% to about 1% by weight if a reducing sugar is employed.

Protein, such as egg albumen, is added to improve the tenderness and crispness of the final product. Suitable proteinaceous materials in addition to egg albumen are, for example, wheat gluten or isolated soy protein. The preferred quantity of protein in the dough is from about 0.5% to about 3.0% by weight and the preferred protein is egg albumen.

Amylopectin is included in the dough composition as binder material to hold the potato particles together. Although amylopectin is available in dry form, the finished potato chip products have a more tender texture when the amylopectin is completely dissolved in water to form a gel which is added to the potato-water mixture. A gel comprising from about 10% to about 50% amylopectin by weight, preferably 20% can be empolyed. Preferably, from about 20% to about 60% of a 20% amylopectin gel is used. This contributes from about 2% to about 30% amylopectin and from about 10% to about 54% water to the composition. The amylopectin can be derived from, for example, waxy maize or potatoes.

In order to obtain the desired blistered surface on the potato chips prepared according to the present invention, it has been found to be necessary to add to the dough a starch complexing agent comprising an edible, long chain fatty acid having from about 10 to about 22 carbon atoms and having a solubilizing polar group. In addition to providing blistering of the finished chip, these compounds also increase the tenderness of the baked chip. An example of a compound which has been found to provide this effect is stearyl monoglyceridyl citrate, which is a mixture of stearic acid and a condensation product of citric acid and a monoglyceride containing a stearyl radical. Other fatty acid radicals of from about 14 to about 22 carbon atoms, such as monostearin, monopalmitin, and the like provide similar compounds. The term "monoglyceride" is intended to include materials containing as little as about one-half monoglyceride with the rest being primarily diglyceride and only a small fraction of triglyceride. The condensation product of citric acid and a monoglyceride can contain a mixture of fatty acid radicals which can be derived from naturally occurring glyceridic materials such as, for example, tallow or cottonseed oil.

Potato starch can optionally be included in the dough to provide opacity in the finished chip and prevent the chips from exhibiting a greasy appearance. It employed, the starch preferably comprises from about 0% to about 10% of the dough by weight. Other ingredients such as flavors; coloring agents; sodium chloride and other salts; antioxidants, such as butylated hydroxytoluene and butylated hydroxyanisole; and the like can be added to the dough but are not necessary.

The ingredients disclosed above can be mixed together by hand to provide a substantially homogeneous dough. Alternatively, the mixing can be performed mechanically by a mixing device. If the latter is used to intermix the ingredients, it is preferred that the mixing be performed at low speed to avoid rupture of the starch granules in the comminuted raw potatoes during the mixing operation and thereby minimize consequent stickiness of the dough. Although the ingredients can all be combined in a single vessel and then mixed together, it is preferred that the ingredients is fluid form, i.e., the potato-water slurry and the amplyopectin gel, be intimately admixed to a uniform consistency and that the dry ingredients, i.e., the egg albumen, stearyl monoglyceridyl citrate, and shortening, and the sugar and potato starch, if employed, be separately added and intimately blended with the fluid ingredients to form a homogeneous dough. The stearyl monoglyceridyl citrate is in a plastic form and is preferably melted prior to addition to the mixture to assure homogeniety of the dough.

After the dough has been prepared, it is divided into a plurality of smaller pieces approximately half a teaspoon in volume. These pieces are rolled into thin flat wafers of dough. The wafers can range from about 0.02 inch to about 0.05 inch in thickness and can be, for example, circular, oval, or elliptical in shape. The elliptical or oval shapes are preferred, however, since sliced raw potatoes have a generally elliptical or oval shape and it is desired that the potato chips of the present invention resemble conventional potato chips as closely as possible.

The resulting wafers of dough are difficult to handle without tearing because the pieces are extremely thin. It has been found that freezing of the wafers greatly simplifies handling in that they thereby become rigid and are less prone to tear. In addition to the handling advantage, freezing of the wafers permits the dough to be prepared and shaped and then stored for extended periods prior to the preparation of the chips.

The baking is preferably performed in two stages to obtain the desired chip texture and surface coloration in a shorter period of time than would be necessary with single-stage baking. The chips are first baked for from about 2 minutes to about 5 minutes at a temperature of about 450° F. and then baked for from about 2 minutes to about 6 minutes at a temperature of about 350° F. Alternatively, the baking can be performed in a single baking step at temperatures of from about 325° F. to about 450° F. for from about 5 minutes to about 16 minutes.

The dough wafer can be baked on a flat surface to form a chip which may have only a relatively small degree of surface curvature, caused either by blistering of the surface or by localized warping of the chip during baking. Preferably, however, the wafers are baked in such a way that a definite curved shape is imparted to the baked chip in order to more closely simulate the shape of conventional chips prepared by frying slices of raw potatoes. This curvature can be imparted to the chips of the present invention by baking the wafers between a pair of similarly configured, curved forming screens which can be formed from, for example, about an 80 mesh U.S. Standard series screen.

The following example of the invention, while not intended to be taken as limiting the scope thereof, will serve to illustrate the compositions of and the processes for making the potato chips of the present invention. Unless otherwise indicated in the example, all percentages are based on weight.

EXAMPLE 200 grams of raw, peeled Kennebec potatoes were diced to form cubes ranging in size from about ¼ inch to about ½ inch. The cube were placed in a Model No. 700A Waring Blendor. 100 grams of cold water was added to the diced potatoes and the mixture was blended for 15 seconds to provide potato particles having an average particle size of about 0.02 inch. The resulting potato-water slurry was then placed onto a wet, fine-weave cloth which was wrapped around the slurry and twisted by hand to squeeze the mixture until 225 grams of water was removed from the slurry to form a potato-water mixture having 50% water. 98.9 grams of an amylopectin gel comprising 20% amylopectin derived from corn and 80% water was intimately admixed by hand with the potato-water mixture to form a homogeneous blend. 6.7 grams of a plastic shortening made from partially hydrogenated cottonseed oil and having an iodine value of 74, 1.9 grams of egg albumen, 1.9 grams of melted stearyl monoglyceridyl citrate ("Seqol 140"), and 6.7 grams of partially hydrogenated soybean oil having a solids content index (SCI) of 11 at 70° F. and an iodine value of 80 were added to the potato-water-amylopectin mixture which was hand stirred for 1 minute to form a uniform dough.

½ teaspoon quantities of the dough were placed between sheets of waxed paper and were rolled into thin, flat wafers having a uniform thickness of 0.035 inch. The wafers were frozen by exposing them to a temperature of 0° F. for one-half hour. The frozen wafers were removed rom the waxed paper and placed between a pair of similarly configured, curved stainless steel screens formed from 80 mesh U.S. Standard series screen. The wafer was baked for 3 minutes at a temperautre of 450° F. and for 4 minutes at a temperature of 350° F. The resulting crisp potato chip had a pleasing potato chip taste and had blistered outer surfaces resembling those of conventional potato chips made by deep fat frying slices of raw potatoes.

In the above example, substantially similar results are obtained in that tasty potato chips having blistered surfaces are produced when:

(a) the quantity of water in the potato-water mixture is within the range of from about 50% to about 60% (e. g., 50%, 55%, and 60%);

(b) the quantity of potato water-mixture of the composition is within the range of from about 20% to about 40% (e.g., 20%, 30%, and 40%);

(c) the quantity of amylopectin in the composition is within the range of from about 2% to about 30% (e.g., 2%, 16%, and 30%) and the corresponding quantity of additional water present because the amylopectin is added as a gel is from about 10% to about 54%;

(d) the quantity of plastic shortening in the composition is within the range of from about 10% to about 25% (e.g., 10%, 17%, and 25%), however, when employed in combination with partially hydrogenated soybean oil the quantity of plastic shortening ranges from about 2.5% to about 10%;

(e) the quantity of stearyl monoglyceridyl citrate in the composition is within the range of from about 25% to about 20% (e.g., 0.25%, 1.25%, and 2.0%);

(f) the quantity of egg albumen in the composition is from about .05% to about 3.0% (e.g., 0.5%, 1.5%, and 3.0%);

(g) the quantity of partially hydrogenated soybean oil in the composition, when employed, is within the range of from about 0% to about 5% (e.g., 0%, 2.5%, and 5%);

(h) the quantity of sugar in the composition, when employed, is within the range of from about 0% to about 2% for a non-reducing sugar (e.g., 0%, 1%, and 2%), and is within the range from about 0% to about 1% for a reducing sugar (eg., 0%, 0.5%, and 1.0%); and (i) the quantity of potato starch in the composition, when employed, is within the range of from about 0% to about 10% (e.g., 0%, 5%, and 10%).

While the particular embodiments of the invention have been illustrated and described, it will be obvious to those skilled in the art that various changes and modifications can be made without departing from the spirit and scope of the invention and it is intended to cover in the appended claims all such changes and modifications that are within the scope of this invention.

We claim:

1. A process for preparing crisp, tasty, edible potato chips having the appearance and eating qualities of potato chips made by deep fat frying slices of raw potatoes, said process comprising:

(a) dicing raw, peeled potatoes to form substantial cubical pieces ranging in size from about ¼ inch to about ½ inch;

(b) reducing the particle size of said diced potatoes in the presences of water to form a slurry comprising water and granular potato particles ranging in size from about 0.015 inch to about 0.03 inch without substantially rupturing the starch granules present in the potatoes;

(c) extracting water from said potato-water slurry to form a mixture of potato particles and water having from about 50% to about 60% water; and (d) intimately admixing from about 20% to about 40% of said mixture of potato particles and water, from about 2% to about 30% amylopectin, from about 0.5% to about 3.0% egg albumen, from about 0.25% to about 2% $C_{14}$–$C_{22}$ acyl monoglyceridyl citrate, from about 5% to about 25% shortening, from 0% to about 2% sugar, and from 0% to about 10% potato starch to form a dough;

(e) forming said dough into substantially flat, bitesize wafers having a thickness of from about 0.02 inch to about 0.05 inch;
(f) freezing said thin, flat wafers; and
(g) baking said frozen wafers at a temperature of from about 325° F. to about 450° F. until they are crisp.

2. The process of claim 1 including the additional step of placing said wafer between a pair of similarly configured curved forming screens immediately prior to baking.

3. The process of claim 1 wherein said shortening comprises form about 5% to about 15% of said dough by weight and consists essentially of about 50% by weight of a normally plastic triglyceride composition having an iodine value of from about 50 to about 90 and about 50% by weight of a partially hydrogenated soybean oil having an iodine value of from about 75 to about 95.

4. A crisp, tasty, edible potato chip product having the appearance and eating qualities of potato chips made by deep fat frying slices of raw potatoes, said product prepared according to the process of claim 1.

References Cited
UNITED STATES PATENTS 3,027,258  3/1962  Markakis et al. _____ 99—81
3,109,739  11/1963  Hilton _____ 99—100

RAYMOND N. JONES, Primary Examiner

W. A. SIMONS, Assistant Examiner